United States Patent
Cao et al.

(10) Patent No.: US 11,755,133 B2
(45) Date of Patent: Sep. 12, 2023

(54) ARRAY SUBSTRATE AND METHOD FOR MANUFACTURING SAME, AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Yaxiong Cao, Beijing (CN); Zhiqiang Wang, Beijing (CN); Xinchao Cui, Beijing (CN); Dongdong Zhang, Beijing (CN); Jianfei Tian, Beijing (CN); Peng Luo, Beijing (CN)

(73) Assignees: Ordos Yuansheng Optoelectronics Co., Ltd., Inner Mongolia (CN); BOE Technology Group Co., Ltd, Beijing (CN)

( * ) Notice: Subject to any disclaimer, the term of this patent is extended or adjusted under 35 U.S.C. 154(b) by 327 days.

(21) Appl. No.: 17/264,871

(22) PCT Filed: May 21, 2020

(86) PCT No.: PCT/CN2020/091550
§ 371 (c)(1),
(2) Date: Feb. 1, 2021

(87) PCT Pub. No.: WO2020/238754
PCT Pub. Date: Dec. 3, 2020

(65) Prior Publication Data
US 2021/0303093 A1    Sep. 30, 2021

(30) Foreign Application Priority Data
May 30, 2019    (CN) .......................... 201910461572.2

(51) Int. Cl.
*G06F 3/041*    (2006.01)
*G06F 3/044*    (2006.01)
(Continued)

(52) U.S. Cl.
CPC ........ *G06F 3/0412* (2013.01); *G02F 1/13338* (2013.01); *G02F 1/13439* (2013.01);
(Continued)

(58) Field of Classification Search
CPC ................. G06F 3/0412; G06F 3/0443; G06F 2203/04103; G06F 3/04164;
(Continued)

(56) References Cited

U.S. PATENT DOCUMENTS 9,252,164 B2    2/2016    Woo et al.
9,280,014 B2    3/2016    Du et al.
(Continued)

FOREIGN PATENT DOCUMENTS

CN    103176302 A    6/2013
CN    103365007 A    10/2013
(Continued)

OTHER PUBLICATIONS

First office action issued in Chinese Patent Application No. 201910461572.2 with search report.

*Primary Examiner* — Pegeman Karimi
(74) *Attorney, Agent, or Firm* — Chiwin Law LLC

(57) ABSTRACT

Disclosed are an array substrate, a manufacturing method thereof, and a display device. The array substrate includes: a base substrate; an electrode layer, located on the base substrate and including a first electrode and a second electrode which are spaced apart from each other; a touch electrode, located on the base substrate, and a touch wire, connected to the touch electrode; the touch electrode and the first electrode are insulated from each other, the touch
(Continued)

electrode and the second electrode are insulated from each other, the touch wire is at one side of the touch electrode away from the base substrate, and the electrode layer is at one side of the touch electrode close to the base substrate.

20 Claims, 10 Drawing Sheets

(51) Int. Cl.
*G02F 1/1333* (2006.01)
*G02F 1/1343* (2006.01)

(52) U.S. Cl.
CPC .. *G02F 1/133345* (2013.01); *G02F 1/133357* (2021.01); *G06F 3/0443* (2019.05); *G06F 2203/04103* (2013.01)

(58) Field of Classification Search
CPC ......... G02F 1/133345; G02F 1/133357; G02F 1/13338; G02F 1/13439; G02F 1/134309; G02F 1/136286
See application file for complete search history.

(56) References Cited

U.S. PATENT DOCUMENTS

| | | |
|---|---|---|
| 9,570,476 B2 | 2/2017 | Ding |
| 9,759,940 B2 | 9/2017 | Shin et al. |
| 10,095,335 B2 | 10/2018 | Li et al. |
| 10,101,838 B2 | 10/2018 | Zhang et al. |
| 10,209,587 B2 | 2/2019 | Wu et al. |
| 10,394,394 B2 | 8/2019 | Jang |
| 10,496,202 B2 | 12/2019 | Zhan et al. |
| 2015/0162349 A1 | 6/2015 | Byeon et al. |
| 2015/0185940 A1* | 7/2015 | Han ................ G06F 3/0412 345/174 |
| 2016/0291727 A1* | 10/2016 | Cao ................ G06F 3/0445 |
| 2016/0291750 A1* | 10/2016 | Chai ............... G06F 3/0412 |
| 2016/0293630 A1* | 10/2016 | Ding .............. H01L 21/32139 |
| 2017/0017320 A1 | 1/2017 | Tsai et al. |
| 2017/0017325 A1 | 1/2017 | Tsai et al. |
| 2018/0081470 A1* | 3/2018 | Li ................... G06F 3/0443 |
| 2020/0212071 A1 | 7/2020 | Guo et al. |
| 2020/0355954 A1 | 11/2020 | Yu et al. |

FOREIGN PATENT DOCUMENTS

| | | |
|---|---|---|
| CN | 104062817 A | 9/2014 |
| CN | 104698707 A | 6/2015 |
| CN | 105717690 A | 6/2016 |
| CN | 106098710 A | 11/2016 |
| CN | 106168865 A | 11/2016 |
| CN | 106249934 A | 12/2016 |
| CN | 106292036 A | 1/2017 |
| CN | 106354294 A | 1/2017 |
| CN | 106444179 A | 2/2017 |
| CN | 106775165 A | 5/2017 |
| CN | 106910750 A | 6/2017 |
| CN | 107015685 A | 8/2017 |
| CN | 107024813 A | 8/2017 |
| CN | 107991799 A | 5/2018 |
| CN | 108376687 A | 8/2018 |
| CN | 108428705 A | 8/2018 |
| CN | 110196521 A | 9/2019 |

* cited by examiner

ARRAY SUBSTRATE AND METHOD FOR MANUFACTURING SAME, AND DISPLAY DEVICE

CROSS-REFERENCE TO RELATED APPLICATIONS

This application is a U.S. National Phase Entry of International Application No. PCT/CN2020/091550 filed on May 21, 2020, designating the United States of America and claiming priority to Chinese Patent Application No. 201910461572.2, filed on May 30, 2019. The present application claims priority to and the benefit of the above-identified applications and the above-identified applications are incorporated by reference herein in their entirety.

TECHNICAL FIELD

At least one embodiment of the present disclosure relates to an array substrate, a manufacturing method thereof, and a display device.

BACKGROUND

With the rapid development of display technology, display devices, such as liquid crystal display devices and organic light-emitting diode display devices, etc., have been widely used in electronic devices, such as tablet computers, mobile phones, and virtual reality (VR) glasses, etc. With the continuous improvement of people's living standard, their requirements for high-quality pictures and low-power-consumption display are also increasing.

SUMMARY

At least one embodiment of the present disclosure relates to an array substrate, a manufacturing method thereof, and a display device, which can improve driving capability and picture quality.

At least one embodiment of the present disclosure provides an array substrate, which includes: a base substrate; an electrode layer, located on the base substrate and including a first electrode and a second electrode which are spaced apart from each other; a touch electrode, located on the base substrate; and a touch wire, connected to the touch electrode. The touch electrode and the first electrode are insulated from each other, the touch electrode and the second electrode are insulated from each other, the touch wire is at one side of the touch electrode away from the base substrate, and the electrode layer is at one side of the touch electrode close to the base substrate.

In the array substrate according to one or a plurality of embodiments of the present disclosure, the touch wire extends in a first direction, the touch wire includes a first portion in contact with the touch electrode, and a size of the first portion in the first direction is greater than or equal to a quarter of a size of the touch electrode in the first direction.

In the array substrate according to one or a plurality of embodiments of the present disclosure, the size of the first portion in the first direction is equal to the size of the touch electrode in the first direction.

In the array substrate according to one or a plurality of embodiments of the present disclosure, the touch wire further includes a second portion not in contact with the touch electrode, a size of the second portion in a second direction is less than a size of the first portion in the second direction, and the second direction is perpendicular to the first direction.

In the array substrate according to one or a plurality of embodiments of the present disclosure, the array substrate further includes: a first passivation layer located at one side of the touch electrode away from the base substrate, the touch electrode having a hollow region; a planarization layer located between the electrode layer and the touch electrode; and a connecting electrode disposed in a same layer as the touch wire. A first via hole is formed in the planarization layer and the first passivation layer to expose the first electrode, and an orthographic projection of the first via hole on the base substrate falls within an orthographic projection of the hollow region on the base substrate; the connecting electrode is connected to the first electrode through the first via hole, the connecting electrode and the touch wire are insulated from each other, and the connecting electrode and the touch electrode are insulated from each other.

In the array substrate according to one or a plurality of embodiments of the present disclosure, the first passivation layer has a second via hole exposing the touch electrode, and the touch wire is connected to the touch electrode through the second via hole.

In the array substrate according to one or a plurality of embodiments of the present disclosure, the array substrate further includes a second passivation layer and a display electrode, wherein the second passivation layer is located at one side of the connecting electrode away from the base substrate, the second passivation layer has a third via hole exposing the connecting electrode, and the display electrode is connected to the connecting electrode through the third via hole.

In the array substrate according to one or a plurality of embodiments of the present disclosure, the array substrate further includes a second passivation layer located at one side of the touch wire away from the base substrate, wherein a surface, away from the base substrate, of a part of the second passivation layer located directly above the touch wire, is a planar surface.

In the array substrate according to one or a plurality of embodiments of the present disclosure, an orthographic projection of the touch wire on the base substrate is at least partially overlapped with an orthographic projection of the second electrode on the base substrate.

In the array substrate according to one or a plurality of embodiments of the present disclosure, the array substrate includes a plurality of touch electrodes and a plurality of touch wires, wherein each of the plurality of touch electrodes is connected to one of the plurality of touch wires.

In the array substrate according to one or a plurality of embodiments of the present disclosure, the plurality of touch wires are distributed in an axisymmetric manner relative to a line parallel to an extension direction of the plurality of touch wires.

In the array substrate according to one or a plurality of embodiments of the present disclosure, one of the first electrode and the second electrode is a source electrode of a thin film transistor, and the other of the first electrode and the second electrode is a drain electrode of the thin film transistor.

At least one embodiment of the present disclosure further provides a display device, which includes any one of the array substrates described above.

At least one embodiment of the present disclosure further provides a manufacturing method of an array substrate, including: forming an electrode layer on a base substrate, wherein the electrode layer includes a first electrode and a second electrode which are spaced apart from each other; and forming a touch electrode and a touch wire on the base substrate, the touch wire being connected to the touch electrode, wherein the touch electrode and the first electrode are insulated from each other, the touch electrode and the second electrode are insulated from each other, the touch wire is at one side of the touch electrode away from the base substrate, and the electrode layer is at one side of the touch electrode close to the base substrate.

In the method according to one or a plurality of embodiments of the present disclosure, the method further includes: forming a planarization film layer on the electrode layer; forming the touch electrode on the planarization film layer, the touch electrode having a hollow region; forming a first passivation film layer on the touch electrode; forming a first via hole penetrating through the first passivation film layer and the planarization film layer to expose the first electrode, wherein an orthographic projection of the first via hole on the base substrate falls within an orthographic projection of the hollow region on the base substrate; and forming a connecting electrode in a same patterning process for forming the touch wire, wherein the connecting electrode is connected to the first electrode through the first via hole.

In the method according to one or a plurality of embodiments of the present disclosure, a second via hole penetrating through the first passivation film layer and exposing the touch electrode is formed during forming the first via hole; and the touch wire is connected to the touch electrode through the second via hole.

In the method according to one or a plurality of embodiments of the present disclosure, the method further includes: forming a second passivation film layer; forming a third via hole in the second passivation film layer to expose the connecting electrode, so as to form a second passivation layer; and forming a display electrode, the display electrode being connected to the connecting electrode through the third via hole.

In the method according to one or a plurality of embodiments of the present disclosure, a surface, away from the base substrate, of a part of the second passivation layer located directly above the touch wire, is a planar surface.

In the method according to one or a plurality of embodiments of the present disclosure, the forming the touch wire includes forming a first portion in contact with the touch electrode, the touch wire extends in a first direction, and a size of the first portion in the first direction is greater than or equal to a quarter of a size of the touch electrode in the first direction.

In the method according to one or a plurality of embodiments of the present disclosure, the size of the first portion in the first direction is equal to the size of the touch electrode in the first direction.

In the method according to one or a plurality of embodiments of the present disclosure, the forming the touch wire further includes forming a second portion not in contact with the touch electrode; a size of the second portion in a second direction is less than a size of the first portion in the second direction, and the second direction is perpendicular to the first direction.

In the method according to one or a plurality of embodiments of the present disclosure, an orthographic projection of the touch wire on the base substrate is at least partially overlapped with an orthographic projection of the second electrode on the base substrate.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
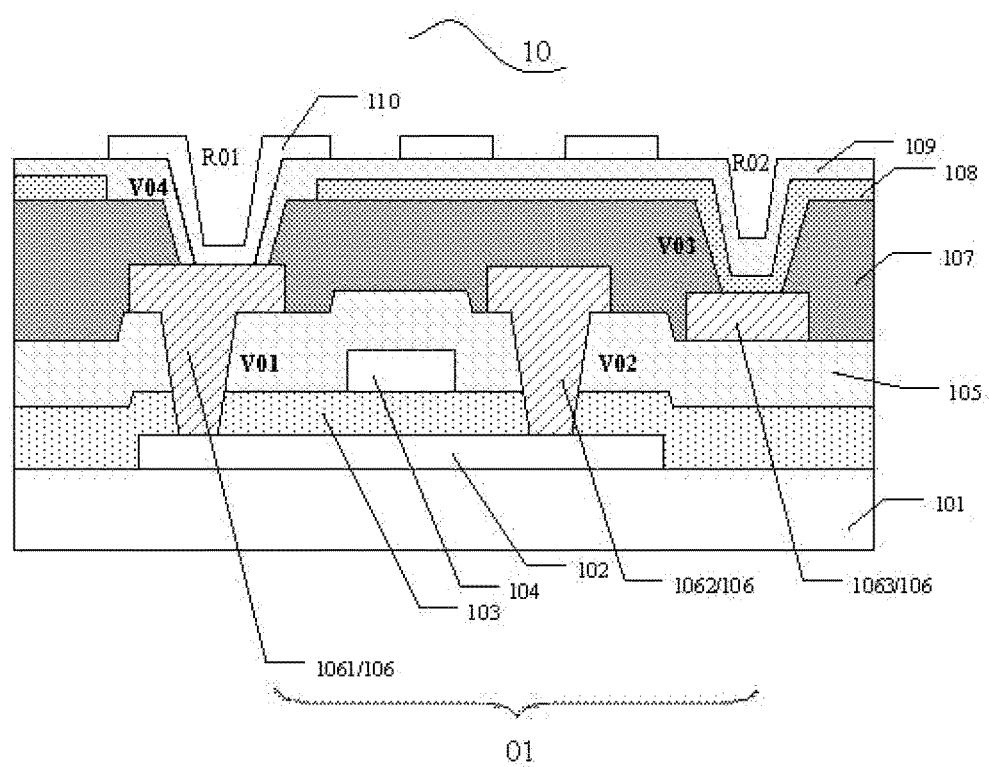
FIG. 1 is a cross-sectional view of an array substrate.

FIG. 1 is a cross-sectional view of an array substrate. As shown in FIG. 1, the array substrate 10 includes a base substrate 101 and a thin film transistor (TFT) 01 disposed on the base substrate 101. The TFT 01 includes an active layer 102, a gate electrode 104, a source-drain layer 106, and a gate insulating layer 103 located between the active layer 102 and the gate electrode 104. The source-drain layer 106 includes a drain electrode 1061 and a source electrode 1062. The drain electrode 1061 and the source electrode 1062 are respectively connected to the active layer 102 and are respectively disposed at both sides of the active layer 102. An interlayer dielectric layer 105 is further disposed at one side of the gate electrode 104 away from the base substrate 101. Via holes V01 and V02 are formed in the gate insulating layer 103 and the interlayer dielectric 105 to expose the active layer 102, and the drain electrode 1061 and the source electrode 1062 are connected to the active layer 102 through the via holes V01 and V02, respectively. The source-drain layer 106 further includes a touch wire 1063 formed together with the drain electrode 1061 and the source electrode 1062 in a same patterning process. A planarization layer 107 is disposed at one side of the source-drain layer 106 away from the base substrate 101. A via hole V03 is formed in the planarization layer 107 to expose the touch wire 1063, and a touch electrode 108 is connected to the touch wire 1063 through the via hole V03. A passivation layer 109 is disposed at one side of the touch electrode 108 away from the base substrate 101. A via hole V04 is formed in the passivation layer 109 and the planarization layer 107 to expose the drain electrode 1061, and a pixel electrode 110 is connected to the drain electrode 1061 through the via hole V04.

As can be seen from FIG. 1, in the array substrate 10, the touch wire 1063, the drain electrode 1061 and the source electrode 1062 can be formed by a same patterning process using a same film layer, and are located at the same side of the touch electrode 108, i.e., at the side of the touch electrode 108 close to the base substrate 101. The planarization layer 107 is arranged at one side of the touch electrode 108 close to the base substrate 101. In general, the planarization layer can be made of an organic material with a large thickness, and hence a via hole therein has a large depth. Due to the formation of the via hole in the planarization layer 107, the planarization layer has a non-uniform material thickness at the position where the pixel electrode 110 is in contact with the drain electrode 1061, which may easily lead to a display defect, such as a black dot, etc. The formation of the via hole in the planarization layer 107 results in a recess R01 at the position where the pixel electrode 110 is connected to the drain electrode 1061 and a recess R02 where the touch wire 1063 is connected to the touch electrode 108. The recess R01 and the recess R02 have a large size, which may easily lead to display defects, such as diagonal fringes, black dots and horizontal/vertical Mura. The limitations the design of the display panel will result in the problems, such as high driving resistance and low transmittance.

Figure 2:
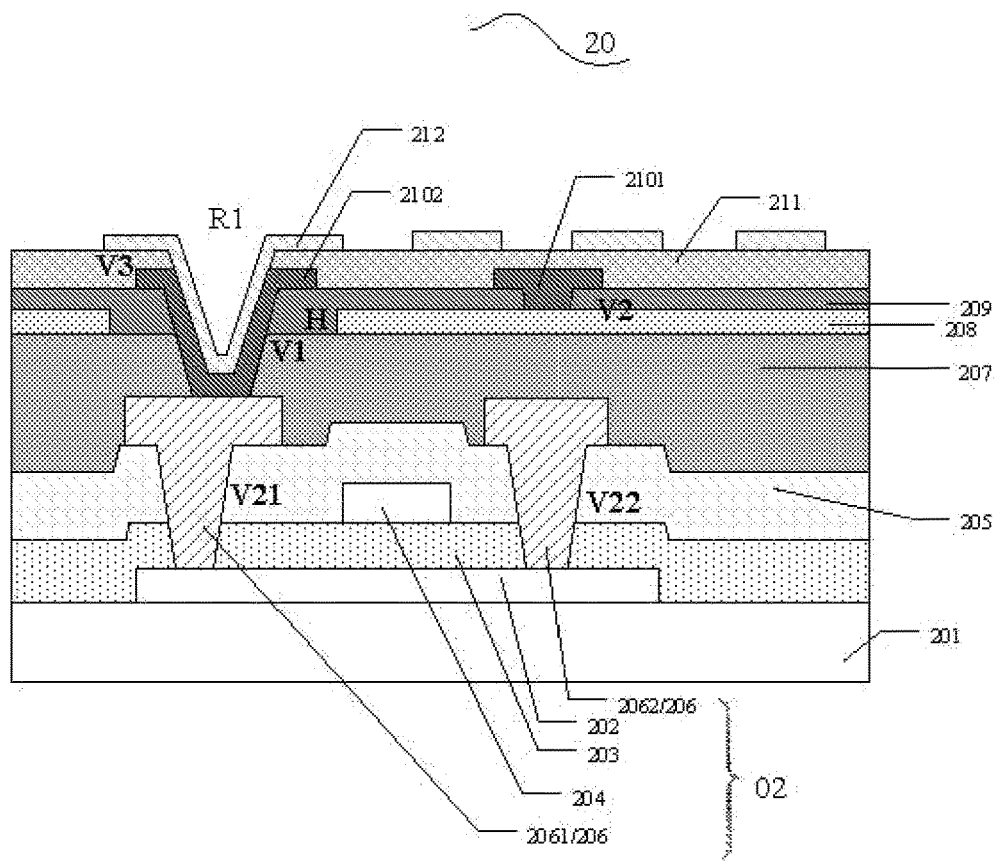
FIG. 2 is a cross-sectional view of an array substrate according to an embodiment of the present disclosure.

FIG. 2 is a cross-sectional view of an array substrate according to an embodiment of the present disclosure. As shown in FIG. 2, the array substrate 20 includes: a base substrate 201, an electrode layer 206, a touch electrode 208, and a touch wire 2101. The electrode layer 206 is located on the base substrate 201 and includes a first electrode 2061 and a second electrode 2062, and the first electrode 2061 and the second electrode 2062 are spaced apart from each other. The touch electrode 208 is located on the base substrate 201. The touch wire 2101 is connected to the touch electrode 208. The touch electrode 208 and the first electrode 2061 are insulated from each other, and the touch electrode 208 and the second electrode 2062 are insulated from each other. The touch wire 2101 is disposed at one side of the touch electrode 208 away from the base substrate 201, and the electrode layer 206 is disposed at one side of the touch electrode 208 close to the base substrate 201. That is, the touch wire 2101 and the electrode layer 206 are disposed at both sides of the touch electrode 208, respectively.

For example, one of the first electrode 2061 and the second electrode 2062 is a source electrode of a thin film transistor (TFT) 02, and the other of the first electrode 2061 and the second electrode 2062 is a drain electrode of the TFT 02. The embodiment as shown in FIG. 2 is described by taking that the first electrode 2061 serves as the drain electrode and the second electrode 2062 serves as the source electrode as an example.

The array substrate 20 according to the embodiment as shown in FIG. 2 differs from the array substrate 10 as shown in FIG. 1 in that the touch wire and the electrode layer are disposed at two sides of the touch electrode. In the array substrate 20 according to the embodiment as shown in FIG. 2, the touch wire 2101 is disposed at one side of the touch electrode 208 away from the base substrate 201. Hence, on the one hand, the touch wire 2101 and the electrode layer 206 are not located in the same layer, thus avoiding mutual interference between the touch wire 2101 and the electrode layer 206; and on the other hand, the touch wire 2101 is disposed at one side of the electrode layer 206 away from the base substrate, thus, it is conducive to improving the smoothness of the surface of the array substrate, there may be no recess at the position where the touch wire 2101 is connected to the touch electrode 208 or the size of the recess at the position where the touch wire 2101 is connected to the touch electrode 208 may be reduced, and display defects, such as diagonal fringes, black dots and horizontal/vertical Mura, can be reduced.

For example, in the array substrate according to the present embodiment, the touch wire 2101 is disposed at one side of the touch electrode 208, away from the base substrate 201, which can increase the contact area between the touch wire 2101 and the touch electrode 208, reduce driving resistance of the array substrate, reduce power consumption, reduce signal transmission attenuation and improve picture quality of the display panel.

For example, as shown in FIG. 2, the array substrate 20 includes a TFT 02 disposed on the base substrate 201. The TFT 02 includes an active layer 202, a gate electrode 204, a source-drain layer 206, and a gate insulating layer 203 located between the active layer 202 and the gate electrode 204. The source-drain layer 206 includes a drain electrode 2061 and a source electrode 2062. The first electrode 2061 and the second electrode 2062 are respectively connected to the active layer 202 and are respectively disposed at both sides of the active layer 202. An interlayer dielectric layer 205 is disposed at one side of the gate electrode 204 away from the base substrate 201. Via holes V21 and V22 are formed in the gate insulating layer 203 and the interlayer dielectric 205 to expose the active layer 202, and the first electrode 2061 and the second electrode 2062 are connected to the active layer 202 through the via holes V21 and V22, respectively. The active layer 202 is, for example, a semiconductor layer. For example, a channel current can be generated in the active layer 202 in the presence of a voltage difference satisfying a set condition between the gate electrode 204 and the first electrode 2061 or between the gate electrode 204 and the second electrode 2062, thus achieving electrical conduction between the first electrode 2061 and the second electrode 2062.

For example, as shown in FIG. 2, the array substrate 20 further includes: a first passivation layer 209 located at one side of the touch electrode 208 away from the base substrate 201, a planarization layer 207 located between the electrode layer 206 and the touch electrode 208, and a connecting electrode 2102 formed in the same layer as the touch wire 2101. The touch electrode 208 has a hollow region H. A first via hole V1 is formed in the planarization layer 207 and the first passivation layer 209 to expose the first electrode 2061, and the orthographic projection of the first via hole V1 on the base substrate 201 falls within the orthographic projection of the hollow region H on the base substrate 201. The connecting electrode 2102 is connected to the first electrode 2061 through the first via hole V1. The connecting electrode 2102 and the touch wire 2101 are insulated from each other, and the connecting electrode 2102 and the touch electrode 208 are insulated from each other. For example, the touch wire 2101 and the connecting electrode 2102 form a functional layer 210.

In the array substrate 20 according to the embodiment of the present disclosure, by providing the connecting electrode 2102 and increasing the height of the first electrode 2061, the contact height between the display electrode 212 and the first electrode 2061 is reduced, the contact area between the display electrode 212 and the connecting electrode 2102 is increased, and thus, the resistance is reduced, the driving resistance of the array substrate is reduced, the power consumption is reduced, the signal transmission attenuation is reduced, and the picture quality of the display panel is improved.

In the array substrate 20 according to the embodiment of the present disclosure, the touch wire 2101 and the connecting electrode 2102 are formed in the same layer, and therefore, the manufacturing process can be shortened and the cost can be saved. In some embodiments, the touch wire 2101 and the connecting electrode 2102 are formed by a same patterning process using a same film layer. For example, the touch wire 2101 and the connecting electrode 2102 include a conductive material, such as a metal, but are not limited thereto. Of course, in some other embodiments, the touch wire 2101 and the connecting electrode 2102 may not be formed using a same film layer. For example, in some embodiments, the connecting electrode 2102 may be omitted, and the display electrode 212 is in direct contact with the first electrode 2061. With the hollow region H provided in the touch electrode 208, the first via hole V1 can be formed within the hollow region H, so as to enable the connection of the connecting electrode 2102 and the first electrode 2061 and the insulation of the connecting electrode 2102 from the touch electrode 208.

For example, as shown in FIG. 2, the first passivation layer 209 has a second via hole V2 exposing the touch electrode 208, and the touch wire 2101 is connected to the touch electrode 208 through the second via hole V2.

For example, as shown in FIG. 2, the array substrate 20 further includes a second passivation layer 211 and a display electrode 212. The second passivation layer 211 is located at one side of the connecting electrode 2102 away from the base substrate 201, the second passivation layer 211 has a third via hole V3 exposing the connecting electrode 2102, and the display electrode 212 is connected to the connecting electrode 2102 through the third via hole V3. For example, the display electrode 212 can be a pixel electrode. For example, the display electrode 212 can be a slit electrode, but is not limited thereto. For example, the display electrode 212 and the touch electrode 208 are insulated from each other.

For example, as shown in FIG. 2, the orthographic projection of the third via hole V3 on the base substrate 201 is at least partially overlapped with the orthographic projection of the first via hole V1 on the base substrate 201. Further, for example, as shown in FIG. 2, the orthographic projection of the third via hole V3 on the base substrate 201 completely falls within the orthographic projection of the first via hole V1 on the base substrate 201.

In the array substrate 20 according to the embodiment of the present disclosure, on the one hand, by providing the connecting electrode 2102, it is equivalent to that the display electrode 212 is connected in parallel to a resistor, and the resistance of the display electrode 212 can be reduced, the driving resistance of the array substrate can be reduced, the power consumption can be reduced, and the signal transmission attenuation can be reduced; and on the other hand, by providing the connecting electrode 2102, the size of the recess at the position where the first electrode 2061 and the display electrode 212 are connected can be reduced, thereby reducing display defects such as diagonal fringes, black dots and horizontal/vertical Mura. For example, the size of the recess R1 as shown in FIG. 2 is less than the size of the recess R01 as shown in FIG. 1.

In the embodiment of the present disclosure, the size reduction of the recess involves at least one of the size reduction in a direction parallel to the base substrate 201 and the size reduction in a direction perpendicular to the base substrate 201. For example, the size reduction of the recess involves the reduction of at least one of the depth of the recess and the diameter of the recess.

For example, in one embodiment, as shown in FIG. 2, a surface, away from the base substrate 201, of a part of the second passivation layer 211 located directly above the touch wire 2101, is a planar surface. That is to say, compared with the array substrate as shown in FIG. 1, the array substrate according to the present embodiment removes the recess at the position where the touch wire 2101 and the touch electrode 208 are connected, thereby reducing display defects such as diagonal fringes, black dots and horizontal/vertical Mura.

Of course, in some other embodiments, there may be a recess at the position where the touch wire 2101 and the touch electrode 208 are connected. However, compared with the array substrate as shown in FIG. 1, even though the array substrate according to the present embodiment has a recess at the position where the touch wire 2101 and the touch electrode 208 are connected, the size of the recess is less than the size of the recess R02 as shown in FIG. 1, because the thickness of the second passivation layer 211 located on the touch wire 2101 is less than the size of the passivation layer 207. Therefore, the array substrate according to the embodiment of the present disclosure can reduce display defects such as diagonal fringes, black dots and horizontal/vertical Mura.

For example, in one embodiment, as shown in FIG. 2, the orthographic projection of the touch wire 2101 on the base substrate 201 is at least partially overlapped with the orthographic projection of the second electrode 2062 on the base substrate 201. For example, the touch wire 2101 and the second electrode 2062 are arranged oppositely up and down. For example, in one embodiment, the orthographic projection of the second electrode 2062 on the base substrate 201 falls within the orthographic projection of the touch wire 2101 on the base substrate 201. The array substrate according to the present embodiment can be beneficial to improving the transmittance.

In the embodiment as shown in FIG. 2, only one touch electrode 208 and one touch wire 2101 are shown. For example, in one embodiment of the present disclosure, the array substrate 20 can include a plurality of touch electrodes 208 and a plurality of touch wires 2101.

Figure 3A:
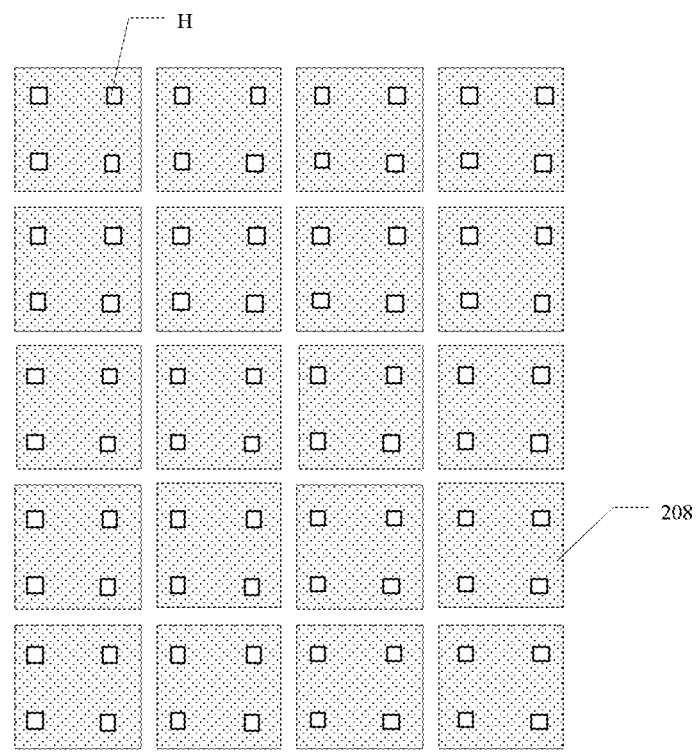
FIG. 3A is a top view of a plurality of touch electrodes in an array substrate according to an embodiment of the present disclosure.

FIG. 3A is a top view of a plurality of touch electrodes in an array substrate according to an embodiment of the present disclosure. For example, in the embodiment of the present disclosure, the plurality of touch electrodes 208 can be arranged in an array. As shown in FIG. 3A, each touch electrode 208 has four hollow regions H. For example, each hollow region H can correspond to one display electrode 212, that is, correspond to one sub-pixel. One sub-pixel can include one TFT 02 and one display electrode 212. The display electrodes 212 in different sub-pixels are insulated from each other, so that each display electrode can be applied with a voltage separately. The touch electrodes 208 can be also used as a common electrode. An electric field can be formed between the common electrode and the display electrode 212 to drive liquid crystal molecules in a display device to rotate, thereby realizing display. In the case where the touch electrodes 208 are also used as a common electrode, display and touch can be carried out in a time-sharing way. That is, the time period of a frame is divided into a display time interval and a touch time interval. A reference voltage can be applied to the common electrode in the display time interval. In the touch time interval, an electric signal is generated by each touch electrode 208 according to the capacitance between a finger and the each touch electrode, and the electric signal is output via the touch wire 2101, for example, to a sensing chip to detect the touch position. In this case, the touch electrode 208 serves as a self-capacitance electrode. For example, the display electrode 212 and the touch electrode 208 are insulated from each other so as to form a voltage difference therebetween.

For example, as shown in FIG. 3A, adjacent touch electrodes 208 are spaced apart from each other. For example, adjacent touch electrodes 208 are insulated from each other, so as to transmit signals, respectively.

It should be noted that in the embodiment of the present disclosure, the number of the touch electrodes 208, the number of the hollow regions H included in each touch electrode 208 and the arrangement manner of the touch electrodes 208 are not limited to those as shown in FIG. 3a and can be set as required.

Figure 3B:
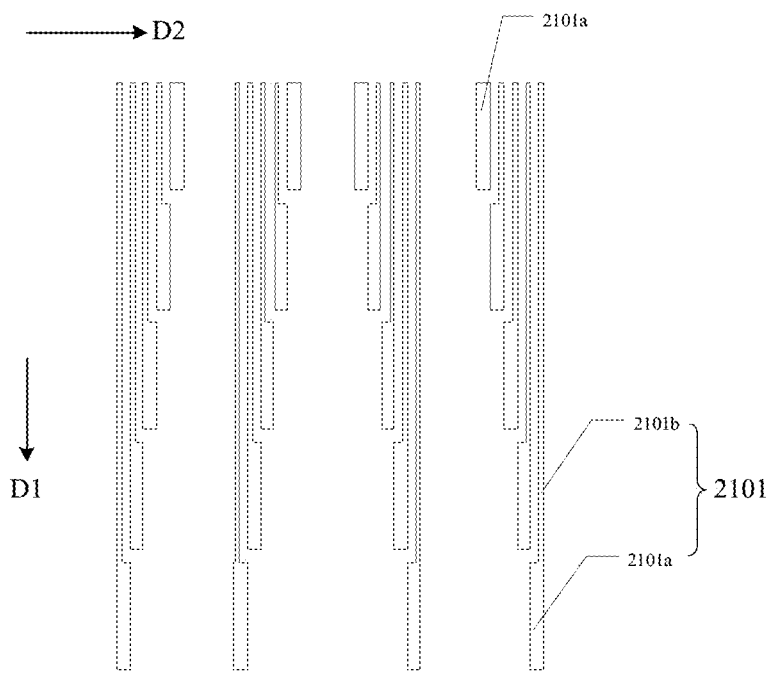
FIG. 3B is a top view of a plurality of touch wires in an array substrate according to an embodiment of the present disclosure.

FIG. 3B is a top view of a plurality of touch wires in an array substrate according to an embodiment of the present disclosure. As shown in FIG. 3B, the array substrate includes a plurality of touch wires 2101. For example, the touch wire 2101 extends in a first direction D1, and the touch wire 2101 includes a first portion 2101a in contact with the touch electrode 208 (see FIG. 2). As shown in FIG. 3B, the plurality of touch wires 2101 are arranged in a second direction D2.

Figure 3C:
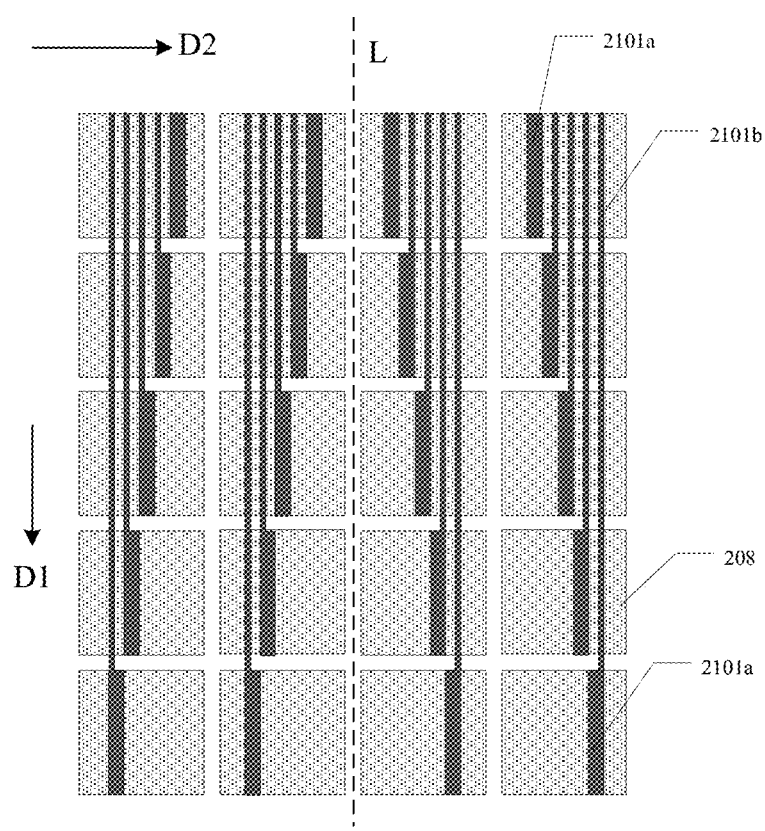
FIG. 3C is a top view of a plurality of touch wires and a plurality of touch electrodes in an array substrate according to an embodiment of the present disclosure.

FIG. 3C is a top view of a plurality of touch wires and a plurality of touch electrodes in an array substrate according to an embodiment of the present disclosure. As shown in FIG. 3C, in order to increase the contact area between the touch electrode 208 and the touch wire 2101 and reduce the resistance, the size of the first portion 2101a in the first direction D1 is greater than or equal to a quarter of the size of the touch electrode 208 in the first direction D1.

For example, as shown in FIG. 3C, each of the plurality of touch electrodes 208 is connected to one of the plurality of touch wires 2101.

For example, in order to minimize the resistance, the size of the first portion 2101a in the first direction D1 is equal to the size of the touch electrode 208 in the first direction D1.

For example, as shown in FIG. 3C and FIG. 3B, the touch wire 2101 further includes a second portion 2101b not in contact with the touch electrode 208. For example, the second portion 2101b and the first portion 2101a are integrated, but are not limited thereto. In order to increase the transmittance, the size of the second portion 2101b in the second direction D2 is less than the size of the first portion 2101a in the second direction D2, and the second direction D2 is perpendicular to the first direction D1.

For example, as shown in FIG. 3C, the plurality of touch wires 2101 are distributed in an axisymmetric manner relative to a line L parallel to the extension direction of the plurality of touch wires 2101. For example, the line L is a dummy line and not a real line present in the array substrate.

For example, as shown in FIG. 3C, the first portion 2101a is in contact with the touch electrode 208. The second portion 2101b is not in contact with the touch electrode 208.

Figure 4A:
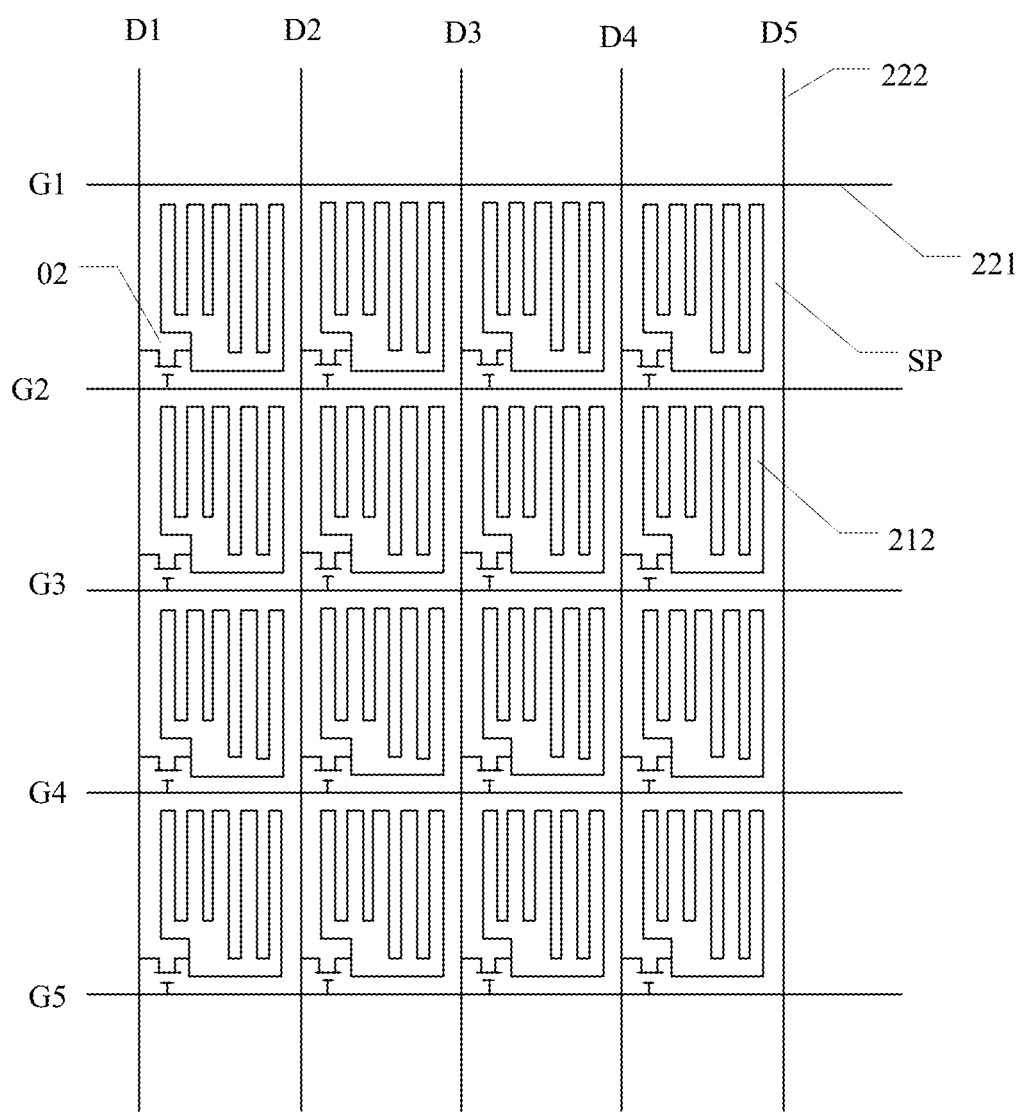
FIG. 4A is a partial structural diagram of an array substrate according to an embodiment of the present disclosure.

FIG. 4A is a partial structural diagram of an array substrate according to an embodiment of the present disclosure. As shown in FIG. 4A, the array substrate includes a plurality of sub-pixels SP. Each sub-pixel SP includes one TFT 02 and one display electrode 212. As shown in FIG. 4A, the display electrode 212 is a slit electrode. The configuration of the display electrode 212 is not limited to that shown in FIG. 4A. As shown in FIG. 4A, the array substrate includes a plurality of gate lines 221 and a plurality of data lines 222. The plurality of gate lines 221 and the plurality of data lines 222 are intersected with each other and are insulated from each other, so as to define a plurality of sub-pixels SP. For example, the plurality of gate lines 221 are formed by a single patterning process using a single film layer, and the plurality of data lines 222 are formed by a single patterning process using a single film layer. An insulating layer is disposed between the plurality of gate lines 221 and the plurality of data lines 222. For example, the plurality of gate lines 221 are parallel to one another, and the plurality of data lines 222 are parallel to one another. The gate line 221 is configured to input a scanning signal to the TFT 02, and the data line 222 is configured to input a data signal to the second electrode 2062 of the TFT. In the case where the TFT is turned on, the data signal is transmitted to the first electrode 2061 through the second electrode 2062 and then transmitted to the display electrode 212.

Figure 4B:
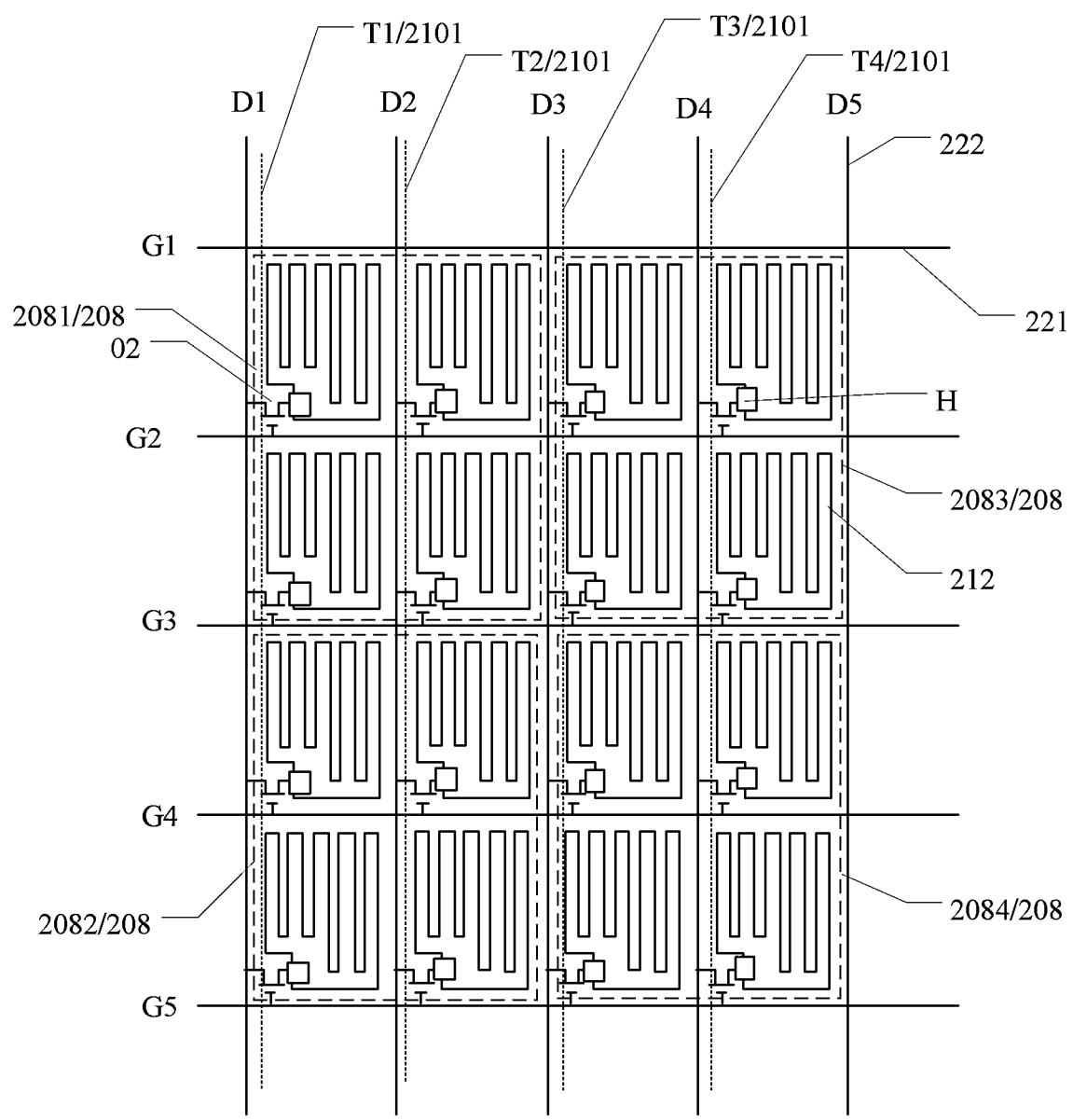
FIG. 4B is a partial structural diagram of an array substrate according to an embodiment of the present disclosure.

FIG. 4B is a partial structural diagram of an array substrate according to an embodiment of the present disclosure. Compared with FIG. 4A, FIG. 4B shows four touch electrodes 208. The four touch electrodes 208 include a first touch electrode 2081, a second touch electrode 2082, a third touch electrode 2083, and a fourth touch electrode 2084. Each touch electrode 208 has four hollow regions H, so that the display electrode is connected to the first electrode of the TFT.

Compared with FIG. 4A, FIG. 4B further shows four touch wires 2101. The four touch wires 2101 include a first touch wire T1, a second touch wire T2, a third touch wire T3, and a fourth touch wire T4. For example, the first touch wire T1 is connected only to the first touch electrode 2081, the second touch wire T2 is connected only to the second touch electrode 2082, the third touch wire T3 is connected only to the third touch electrode 2083, and the fourth touch wire T4 is connected only to the fourth touch electrode 2084.

For example, in the case where the TFT is turned on, a data signal is transmitted to the display electrode 212, and there exists a voltage difference between the display electrode 212 and the touch electrode 208 (see FIG. 2) which is also used as the common electrode, so as to generate an electric field. The electric field is capable of driving the liquid crystal molecules in the region where the sub-pixel is located to rotate. FIG. 4A and FIG. 4B show gate lines G1-G5 and data lines D1-D5. It should be noted that in the embodiment of the present disclosure, the number of the gate lines 221, the number of the data lines 222 and the number of the sub-pixels (SP) are not limited to those as shown in FIG. 4A and can be determined as required.

For example, the touch wire 2101 as shown in FIG. 4B can cover the second electrode 2062 of the TFT (see FIG. 2). The touch wire 2101 shown in FIG. 4B is located at the right side of the data line 222. For example, the touch wire 2101 shown FIG. 4B can be disposed at the other side of the data line 222, that is, the touch wire 2101 shown in FIG. 4B can be disposed at the left side of the data line 222.

For example, in an embodiment of the present disclosure, the first passivation layer 209 has a thickness substantially in the range of 30-50 nm.

For example, in an embodiment of the present disclosure, at least one of the first touch wire 2101 and the connecting electrode 2102 has a thickness substantially in the range of 50-80 nm.

For example, in an embodiment of the present disclosure, the second passivation layer 211 has a thickness substantially in the range of 30-50 nm.

For example, in an embodiment of the present disclosure, the thickness of the first passivation layer 209 and the thickness of the second passivation layer 211 are less than the thickness of the passivation layer 207.

For example, in an embodiment of the present disclosure, the display electrode 212 and the touch electrode 208 can be made of a conductive material. The conductive material includes a metal, a metal oxide, etc. The metal oxide includes indium tin oxide (ITO), but is not limited thereto. The electrode layer 206 and the touch wires 2101 can be made of a conductive material, for example, made of a metal material, but are not limited thereto.

For example, in an embodiment of the present disclosure, the first passivation layer 209, the second passivation layer 211, the gate insulating layer 203 and the interlayer dielectric layer 205 can be made of an insulating material. For example, the insulating material includes at least one of silicon oxide, silicon nitride and silicon oxynitride, but is not limited thereto.

For example, in an embodiment of the present disclosure, the passivation layer 207 can be made of an organic material. For example, the organic material includes a resin, but is not limited thereto.

At least one embodiment of the present disclosure further provides a display device which includes any one of the array substrates 20 as described above. For example, the display device can be a liquid crystal display device.

Figure 5:
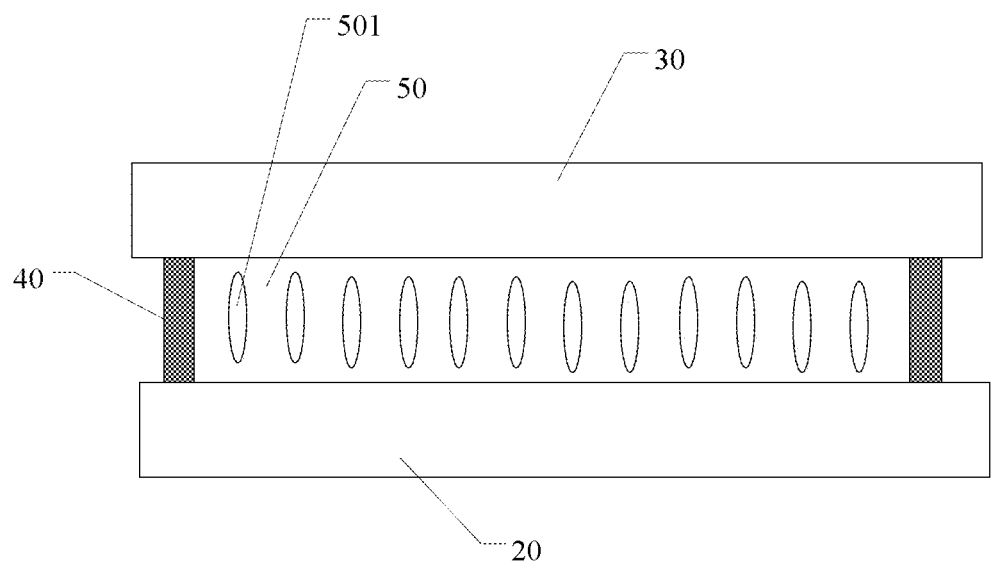
FIG. 5 is a schematic diagram of a display device according to an embodiment of the present disclosure.

FIG. 5 is a schematic diagram of a display device according to an embodiment of the present disclosure. The display device includes any one of the array substrates 20 as described above and a counter substrate 30 opposite to the array substrate 20. The array substrate 20 and the counter substrate 30 are assembled through a sealant 40 to form a cell. A liquid crystal layer 50 is disposed in the cell. The liquid crystal layer 50 includes a plurality of liquid crystal molecules 501. In some embodiments, a filter layer can be provided at one side of the counter substrate 30 facing the array substrate 20, thereby realizing color display. For example, the filter layer includes a plurality of filter units, and each filter unit can correspond to one display electrode. For example, the plurality of filter units include a plurality of red filter units, a plurality of green filter units, and a plurality of blue filter units, but are not limited thereto.

FIG. 5 is described by taking that the display device is a liquid crystal display device as an example. The array substrate 20 according to the embodiment of the present disclosure can also be applied in an organic light-emitting diode display device. In this case, the touch electrode 208 is not used as any other electrode, the display electrode 212 can be used as an anode of an organic light-emitting diode, and a light-emitting functional layer and a cathode corresponding to the display electrode 212 can be disposed at one side of the display electrode 212 away from the base substrate 201.

Hereinafter, a manufacturing method an array substrate will be described by taking the manufacturing of the array substrate 20 shown in FIG. 2 as an example. The reference numerals of respective components in the manufacturing method according to the embodiment of the present disclosure can be referred to the reference numerals of respective components in the array substrate 20.

FIGS. 6-13 are schematic diagrams of a manufacturing method of an array substrate according to an embodiment of the present disclosure.

For example, the manufacturing method of the array substrate 20 according to an embodiment of the present disclosure includes the following steps.

Figure 6:
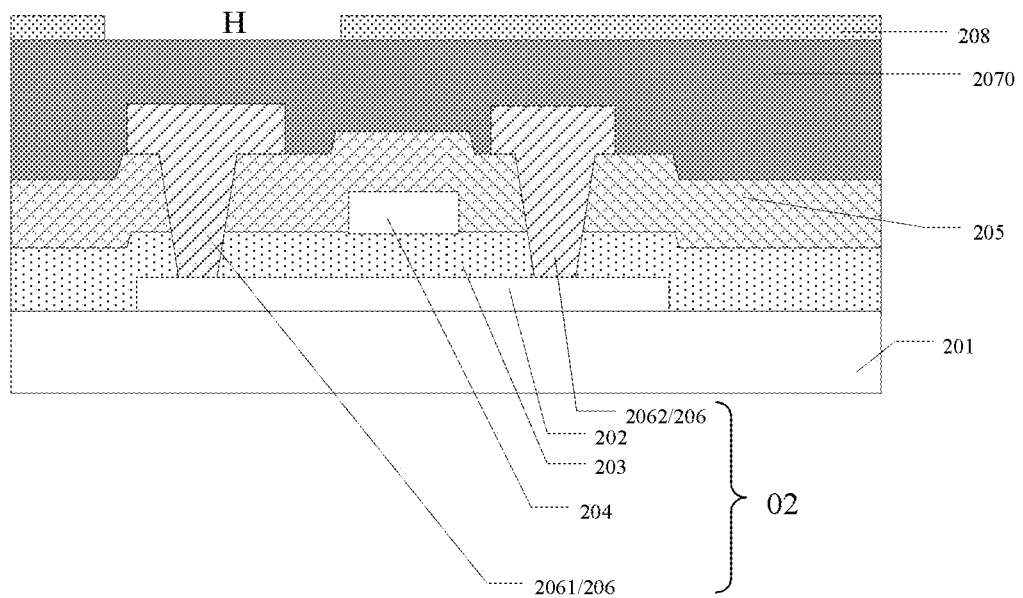
FIGS. 6-13 are schematic diagrams of a manufacturing method of an array substrate according to an embodiment of the present disclosure.

As shown in FIG. 6, an electrode layer 206 is formed on the base substrate 201, wherein the electrode layer 206 includes a first electrode 2061 and a second electrode 2062, and the first electrode 2061 and the second electrode 2062 are spaced apart from each other.

For example, a TFT 02 can be firstly formed on the base substrate 201. The specific structure of the TFT 02 can be referred to the structure of the TFT 02 in the array substrate 20, which will not be repeated here. For example, the base substrate 201 includes, but is not limited to, a glass substrate, and can be determined as required.

As shown in FIG. 6, a touch electrode 208 is formed on the base substrate 201.

Figure 10:
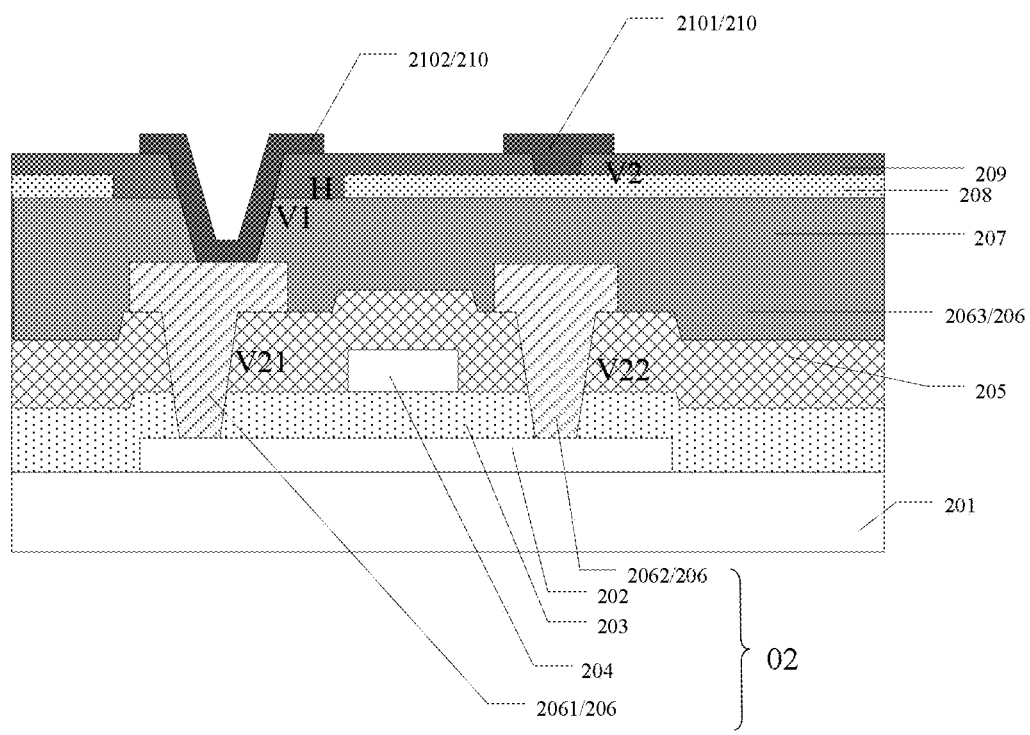

As shown in FIG. 10, a touch wire 2101 is formed on the base substrate 201. The touch wire 2101 is connected to the touch electrode 208. The touch electrode 208 and the first electrode 2061 are insulated from each other, and the touch electrode 208 and the second electrode 2062 are insulated from each other. The touch wire 2101 is disposed at one side of the touch electrode 208 away from the base substrate 201, and the electrode layer 206 is disposed at one side of the touch electrode 208 close to the base substrate 201.

For example, in some embodiments, the method further includes the following steps.

As shown in FIG. 6, a planarization film layer 2070 is formed on the electrode layer 206.

As shown in FIG. 6, a touch electrode 208 is formed on the planarization film layer 2070, wherein the touch electrode 208 has a hollow region H.

As shown in FIG. 10, a touch wire 2101 is formed on the touch electrode 208.

Figure 7:
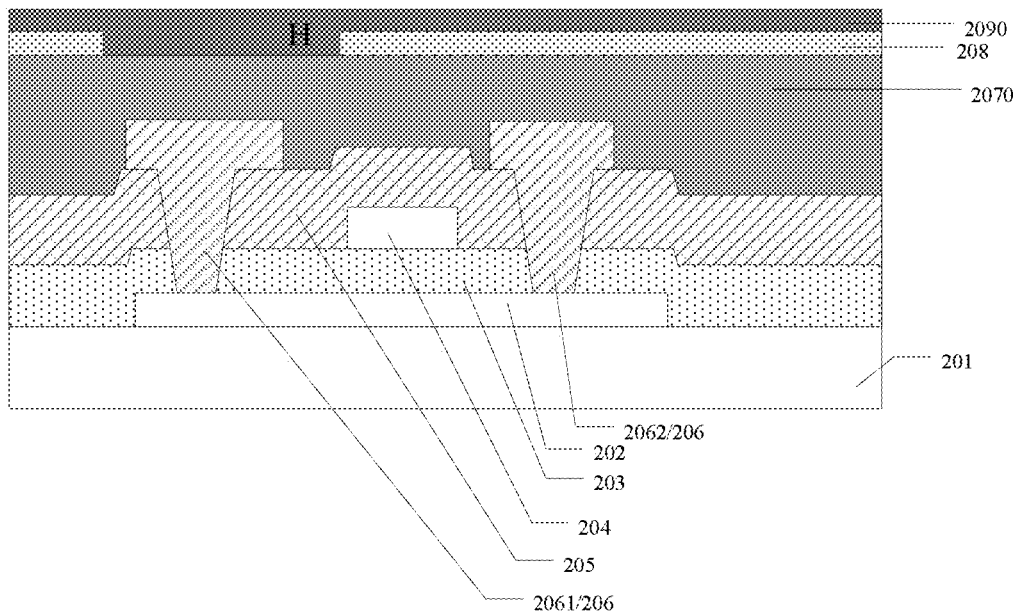

As shown in FIG. 7, in some embodiments, a first passivation film layer 2090 is formed on the touch electrode 208.

Figure 8:
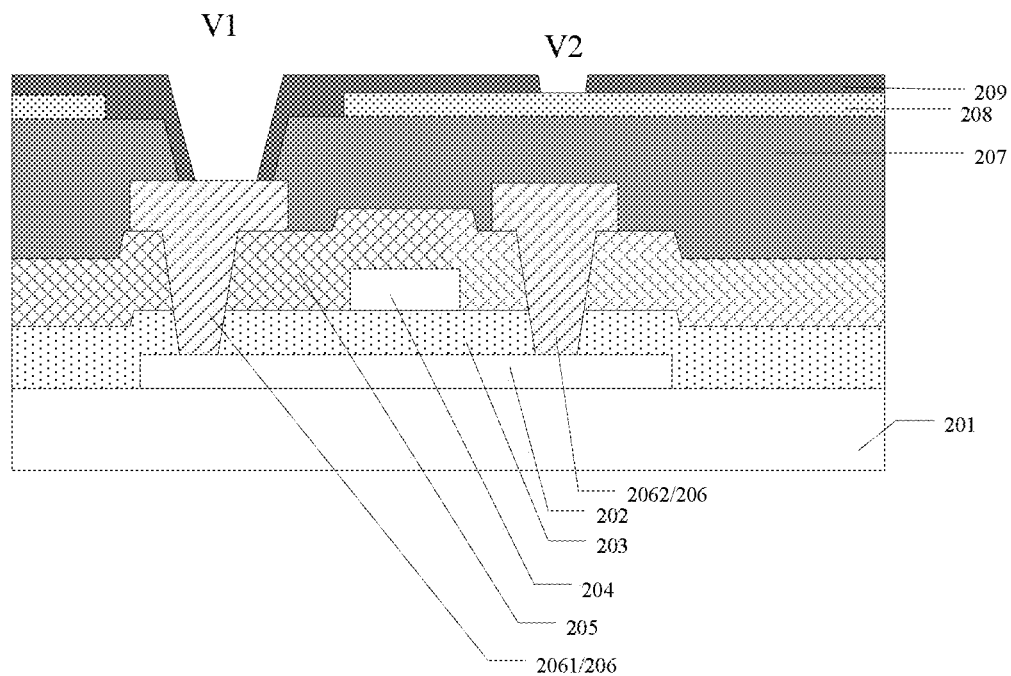

As shown in FIG. 8, a first via hole V1 penetrating through the first passivation film layer 2090 and the planarization film layer 2070 is formed to expose the first electrode 2061, wherein the orthographic projection of the first via hole V1 on the base substrate 201 falls within the orthographic projection of the hollow region H on the base substrate 201.

As shown in FIG. 10, a connecting electrode 2102 is formed in a same patterning process for forming the touch wire 2101, wherein the connecting electrode 2102 is connected to the first electrode 2061 through the first via hole V1.

Figure 9:
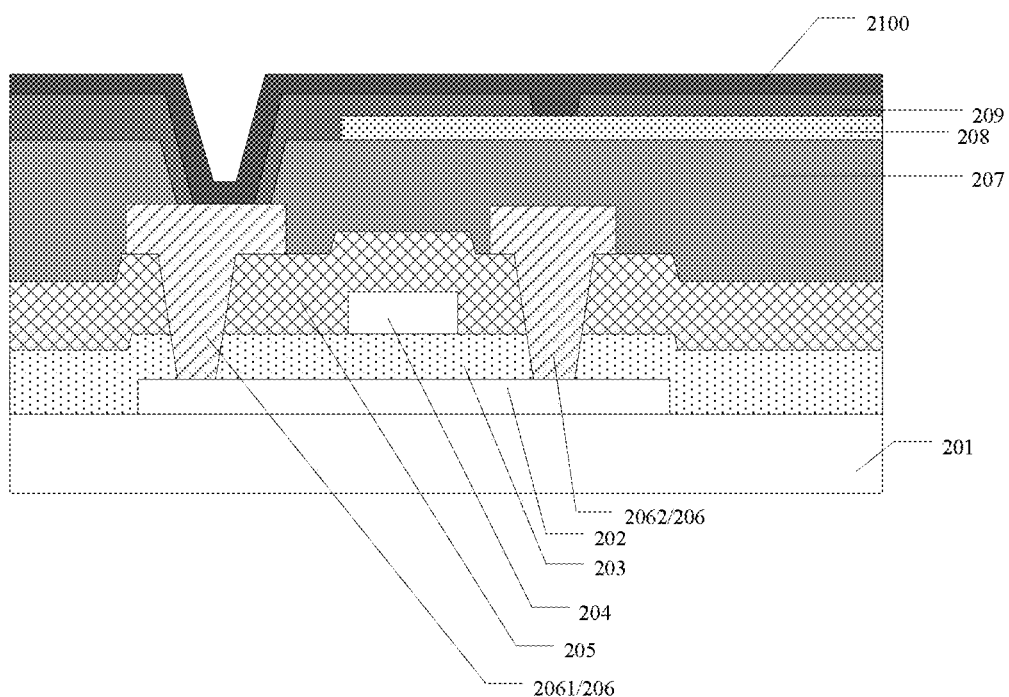

For example, forming the touch wire 2101 and forming the connecting electrode 2102 includes forming a functional film layer 2100 as shown in FIG. 9. The functional film layer 2100 is a conductive layer. The touch wire 2101 and the connecting electrode 2102 are formed while the functional film layer 2100 is patterned.

For example, in some embodiments, the method further includes the following steps.

As shown in FIG. 8, a second via hole V2 penetrating through the first passivation film layer and exposing the touch electrode 208 is formed during forming the first via hole V1, so that a first passivation layer 209 and a planarization layer 207 are formed. The touch wire 2101 is connected to the touch electrode 208 through the second via hole V2.

For example, in some embodiments, the method further includes the following steps.

Figure 11:
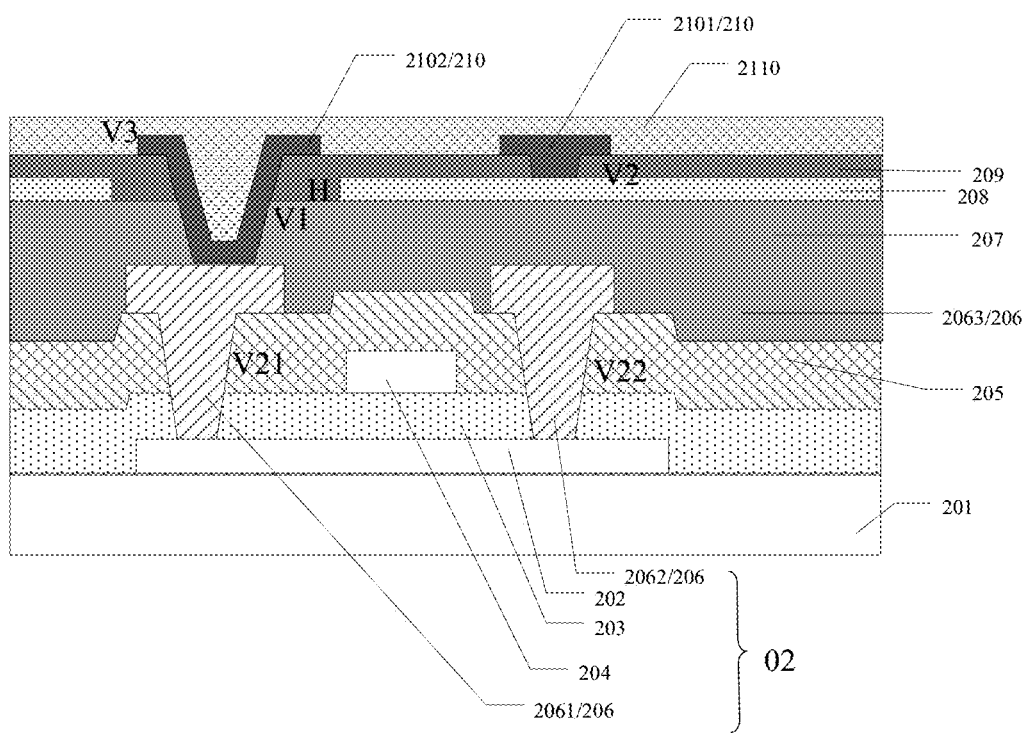

As shown in FIG. 11, a second passivation film layer 2110 is formed.

Figure 12:
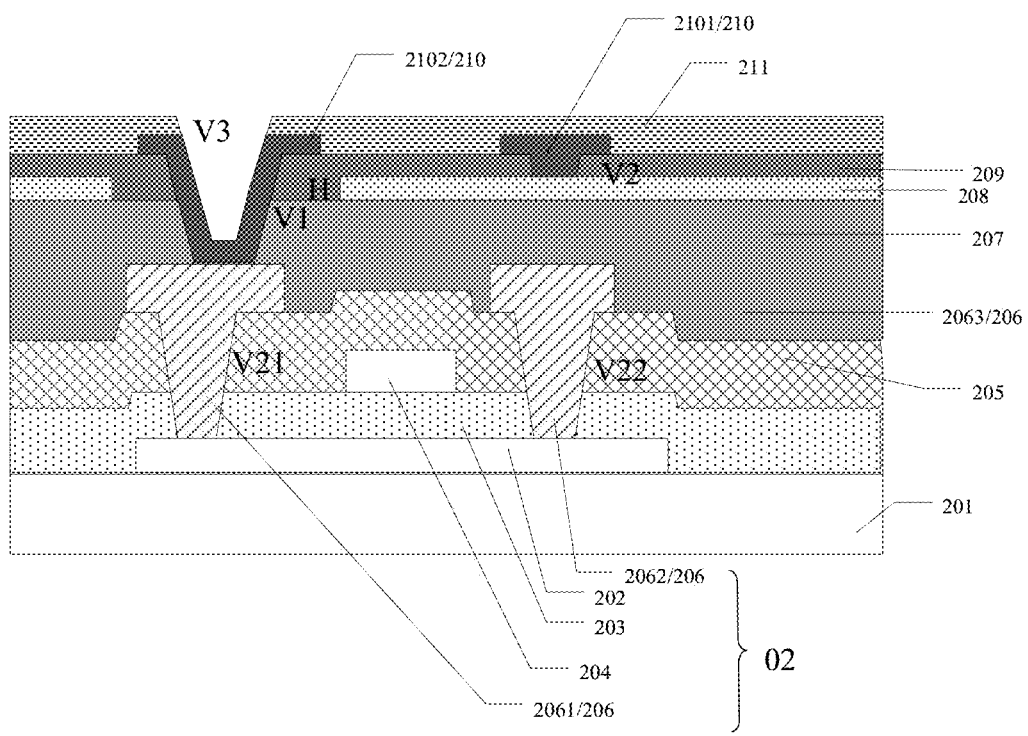

As shown in FIG. 12, a third via hole V3 is formed in the second passivation film layer 2110 to expose the connecting electrode 2102, so as to form a second passivation layer 211 (see FIG. 2).

As shown in FIG. 2, a display electrode 212 is formed. The display electrode 212 is connected to the connecting electrode 2102 through the third via hole V3.

Figure 13:
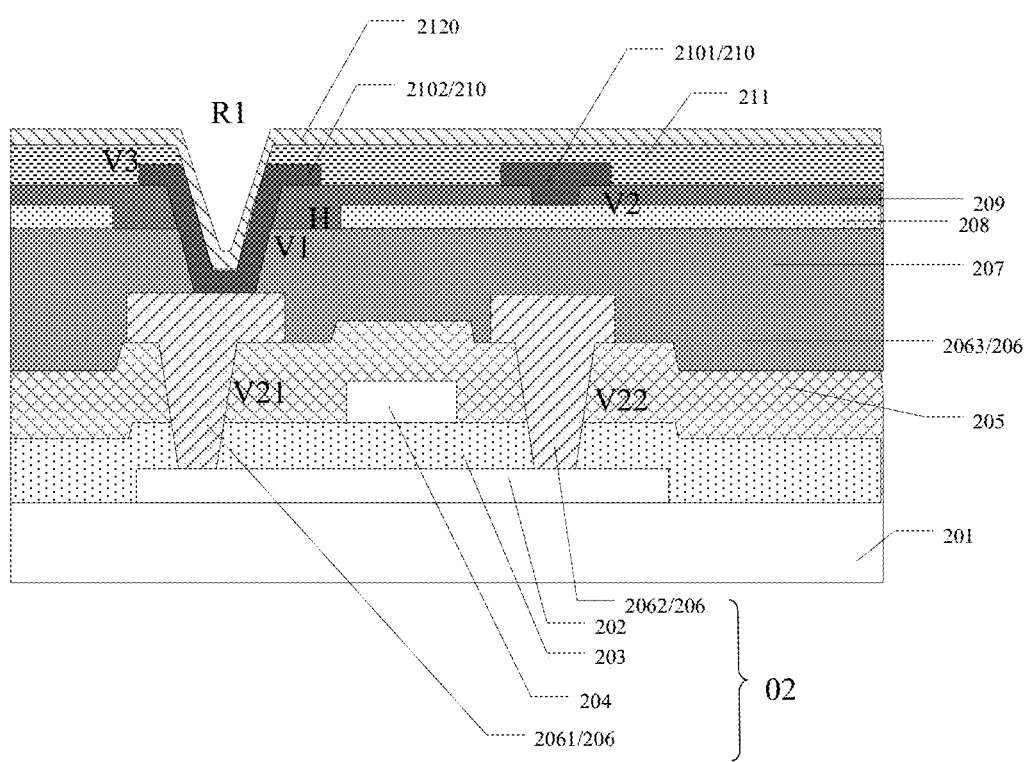

For example, in some embodiments, forming the display electrode 212 includes forming a display electrode film 2120 as shown in FIG. 13. The display electrode film 2120 is patterned to form the display electrode 212 (see FIG. 2).

For example, as shown in FIG. 2, in the manufacturing method according to the embodiment of the present disclosure, a surface, away from the base substrate 201, of the part of the second passivation layer 211 located directly above the touch wire 2101, is a planar surface.

For example, as shown in FIG. 3C, in the manufacturing method according to the embodiment of the present disclosure, forming the touch wire 2101 includes forming a first portion 2101a in contact with the touch electrode 208, wherein the touch wire 2101 extends in the first direction D1, and the size of the first portion 2101a in the first direction D1 is greater than or equal to a quarter of the size of the touch electrode 208 in the first direction D1. That is to say, in the case where the second via hole V2 is manufactured, the size of the second via hole V2 in the first direction D1 can be greater than or equal to a quarter of the size of the touch electrode 208 in the first direction D1. For example, the size of the first portion 2101a in the first direction D1 is equal to the size of the touch electrode 208 in the first direction D1.

For example, forming the touch wire 2101 further includes forming a second portion 2101b not in contact with the touch electrode 208. In order to increase the transmittance of the display device, the size of the second portion 2101b in the second direction D2 is less than the size of the first portion 2101a in the second direction D2, and the second direction D2 is perpendicular to the first direction D1.

For example, in order to increase the transmittance of the display device, the orthographic projection of the touch wire 2101 on the base substrate 201 is at least partially overlapped with the orthographic projection of the second electrode 2062 on the base substrate 201.

A manufacturing method of an array substrate according to an embodiment of the present disclosure will be described below with reference to FIGS. 6-13.

A manufacturing method of an array substrate according to an embodiment of the present disclosure includes the following steps.

S1, as shown in FIG. 6, forming a TFT 02 on the base substrate 201. Forming the TFT 02 includes forming an electrode layer 206, wherein the electrode layer 206 includes a first electrode 2061 and a second electrode 2062 which are spaced apart from each other. The method for forming other structures of the TFT 02 in the array substrate can be referred to the description of the corresponding structures, which will not be repeated here.

S2, as shown in FIG. 6, forming a planarization film layer 2070 on the TFT 02/the electrode layer 206.

S3, as shown in FIG. 6, forming a touch electrode 208 on the planarization film layer 2070, wherein the touch electrode 208 has a hollow region H. For example, the touch electrode 208 can be formed by the following procedure: firstly forming a touch electrode film and patterning the touch electrode film to form the touch electrode 208.

S4, as shown in FIG. 7, forming a first passivation film layer 2090 on the touch electrode 208.

S5, as shown in FIG. 8, forming a first via hole V1 penetrating through the first passivation film layer 2090 and the planarization film layer 2070 to expose the first electrode 2061, wherein the orthographic projection of the first via hole V1 on the base substrate 201 falls within the orthographic projection of the hollow region H on the base substrate 201; and forming a second via hole V2 penetrating through the first passivation film layer 2090 and exposing the touch electrode 208 while forming the first via hole V1. In this step, a planarization layer 207 and a first passivation layer 209 are formed.

S6, as shown in FIG. 9, forming a functional film layer 2100. The functional film layer 2100 is a conductive layer.

S7, as shown in FIG. 10, patterning the functional film layer 2100 to form a connecting electrode 2102 and a touch wire 2101. The connecting electrode 2102 is connected to the first electrode 2061 through the first via hole. The touch wire 2101 is connected to the touch electrode 208 through the second via hole V2.

S8, as shown in FIG. 11, forming a second passivation film layer 2110.

S9, as shown in FIG. 12, forming a third via hole V3 penetrating through the second passivation film layer 2110, so as to form a second passivation layer 211.

S10, as shown in FIG. 13, forming a display electrode film.

S11, patterning the display electrode film 2120 to form a display electrode 212 (as shown in FIG. 2).

For example, in the embodiments of the present disclosure, that a first component has a via hole exposing a second component means that the via hole penetrates through a film which is used to form the first component, so as to allow a third component subsequently formed to be connected to the second component through the via hole.

For example, that two components are disposed in the same layer, formed in the same layer, located in the same layer or the like, means that the two components are formed by a single patterning process using a single film layer. The two components located in the same layer can be in contact with a same base material or in contact with different base materials. Two components located in the same layer can have the same height or different heights relative to the base substrate.

It should be noted that, for the sake of clarity, the thickness of a layer or region is exaggerated in the drawings for describing the embodiments of the present disclosure. It should be understood that in the case where an element such as a layer, film, region or substrate is referred to as being "on" or "under" another element, the element may be "directly" "on" or "under" the another element, or an intervening element may be present therebetween.

In the embodiments of the present disclosure, the patterning or patterning process can include only a photolithography process, or can include a photolithography process and an etching step, or can include other processes for forming a predetermined pattern such as printing, inkjet, etc. The photolithography process refers to a process including film formation, exposure, development, etc., which uses a photoresist, a mask, a exposure machine, etc., to form a pattern. The corresponding patterning process can be selected according to the structure to be formed in the embodiments of the present disclosure.

In case of no conflict, the features in a same embodiment and in different embodiments of the present disclosure can be combined with each other.

What have been described above are only specific implementations of the present disclosure, and the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be determined based on the protection scope of the claims.

What is claimed is:

1. An array substrate, comprising:
a base substrate;
an electrode layer, located on the base substrate and comprising a first electrode and a second electrode which are spaced apart from each other;
a touch electrode, located on the base substrate; and
a touch wire, connected to the touch electrode,
wherein the touch electrode and the first electrode are insulated from each other, the touch electrode and the second electrode are insulated from each other,
the touch wire is at one side of the touch electrode away from the base substrate, and the electrode layer is at one side of the touch electrode close to the base substrate; and
wherein the touch wire extends in a first direction, the touch wire comprises a first portion in contact with the touch electrode, and a size of the first portion in the first direction is greater than or equal to a quarter of a size of the touch electrode in the first direction.

2. The array substrate according to claim 1, wherein the size of the first portion in the first direction is equal to the size of the touch electrode in the first direction.

3. The array substrate according to claim 1, wherein the touch wire further comprises a second portion not in contact with the touch electrode, a size of the second portion in a second direction is less than a size of the first portion in the second direction, and the second direction is perpendicular to the first direction.

4. The array substrate according to claim 1, further comprising a second passivation layer located at one side of the touch wire away from the base substrate, wherein a surface, away from the base substrate, of a part of the second passivation layer located directly above the touch wire, is a planar surface.

5. The array substrate according to claim 1, wherein an orthographic projection of the touch wire on the base substrate is at least partially overlapped with an orthographic projection of the second electrode on the base substrate.

6. The array substrate according to claim 1, comprising a plurality of touch electrodes and a plurality of touch wires, wherein each of the plurality of touch electrodes is connected to one of the plurality of touch wires.

7. The array substrate according to claim 6, wherein the plurality of touch wires are distributed in an axisymmetric manner relative to a line parallel to an extension direction of the plurality of touch wires.

8. A display device, comprising an array substrate according to claim 1.

9. The array substrate according to claim 1, further comprising:
a first passivation layer located at one side of the touch electrode away from the base substrate, the touch electrode having a hollow region;
a planarization layer located between the electrode layer and the touch electrode; and
a connecting electrode disposed in a same layer as the touch wire,
wherein a first via hole is formed in the planarization layer and the first passivation layer to expose the first electrode, and an orthographic projection of the first via hole on the base substrate falls within an orthographic projection of the hollow region on the base substrate;
the connecting electrode is connected to the first electrode through the first via hole, the connecting electrode and the touch wire are insulated from each other, and the connecting electrode and the touch electrode are insulated from each other.

10. An array substrate, comprising:
a base substrate;
an electrode layer, located on the base substrate and comprising a first electrode and a second electrode which are spaced apart from each other;
a touch electrode, located on the base substrate; and
a touch wire, connected to the touch electrode,
wherein the touch electrode and the first electrode are insulated from each other, the touch electrode and the second electrode are insulated from each other,
the touch wire is at one side of the touch electrode away from the base substrate, and the electrode layer is at one side of the touch electrode close to the base substrate; and
the array substrate further comprises:
a first passivation layer located at one side of the touch electrode away from the base substrate, the touch electrode having a hollow region;
a planarization layer located between the electrode layer and the touch electrode; and
a connecting electrode disposed in a same layer as the touch wire,
wherein a first via hole is formed in the planarization layer and the first passivation layer to expose the first electrode, and an orthographic projection of the first via hole on the base substrate falls within an orthographic projection of the hollow region on the base substrate;
the connecting electrode is connected to the first electrode through the first via hole, the connecting electrode and the touch wire are insulated from each other, and the connecting electrode and the touch electrode are insulated from each other.

11. The array substrate according to claim 10, wherein the first passivation layer has a second via hole exposing the touch electrode, and the touch wire is connected to the touch electrode through the second via hole.

12. The array substrate according to claim 10, further comprising a second passivation layer and a display electrode, wherein the second passivation layer is located at one side of the connecting electrode away from the base substrate, the second passivation layer has a third via hole exposing the connecting electrode, and the display electrode is connected to the connecting electrode through the third via hole.

13. The array substrate according to claim 12, wherein an orthographic projection of the third via hole on the base substrate is at least partially overlapped with the orthographic projection of the first via hole on the base substrate.

14. The array substrate according to claim 10, further comprising a second passivation layer located at one side of the touch wire away from the base substrate, wherein a surface, away from the base substrate, of a part of the second passivation layer located directly above the touch wire, is a planar surface.

15. A manufacturing method of an array substrate, comprising:
 forming an electrode layer on a base substrate, wherein the electrode layer comprises a first electrode and a second electrode which are spaced apart from each other; and
 forming a touch electrode and a touch wire on the base substrate, the touch wire being connected to the touch electrode,
 wherein the touch electrode and the first electrode are insulated from each other, the touch electrode and the second electrode are insulated from each other,
 the touch wire is at one side of the touch electrode away from the base substrate, and the electrode layer is at one side of the touch electrode close to the base substrate, and
 wherein the forming the touch wire comprises forming a first portion in contact with the touch electrode,
 the touch wire extends in a first direction, and
 a size of the first portion in the first direction is greater than or equal to a quarter of a size of the touch electrode in the first direction.

16. The method according to claim 15, further comprising:
 forming a planarization film layer on the electrode layer;
 forming the touch electrode on the planarization film layer, the touch electrode having a hollow region;
 forming a first passivation film layer on the touch electrode;
 forming a first via hole penetrating through the first passivation film layer and the planarization film layer to expose the first electrode, wherein an orthographic projection of the first via hole on the base substrate falls within an orthographic projection of the hollow region on the base substrate; and
 forming a connecting electrode in a same patterning process for forming the touch wire, wherein the connecting electrode is connected to the first electrode through the first via hole.

17. The method according to claim 16, wherein a second via hole penetrating through the first passivation film layer and exposing the touch electrode is formed during forming the first via hole; and the touch wire is connected to the touch electrode through the second via hole.

18. The method according to claim 16, further comprising:
 forming a second passivation film layer;
 forming a third via hole in the second passivation film layer to expose the connecting electrode, so as to form a second passivation layer; and
 forming a display electrode, the display electrode being connected to the connecting electrode through the third via hole.

19. The method according to claim 18, wherein a surface, away from the base substrate, of a part of the second passivation layer located directly above the touch wire, is a planar surface.

20. The method according to claim 15, wherein the forming the touch wire further comprises forming a second portion not in contact with the touch electrode;
 a size of the second portion in a second direction is less than a size of the first portion in the second direction, and the second direction is perpendicular to the first direction.

* * * * *

UNITED STATES PATENT AND TRADEMARK OFFICE
CERTIFICATE OF CORRECTION

| | | |
|---|---|---|
| PATENT NO. | : 11,755,133 B2 | Page 1 of 1 |
| APPLICATION NO. | : 17/264871 | |
| DATED | : September 12, 2023 | |
| INVENTOR(S) | : Yaxiong Cao et al. | |

It is certified that error appears in the above-identified patent and that said Letters Patent is hereby corrected as shown below:

On the Title Page

Item (73) Second Assignee: BOE Technology Group Co., Ltd
Should be corrected to: BOE Technology Group Co., Ltd.

Signed and Sealed this
Twenty-eighth Day of November, 2023

Katherine Kelly Vidal
*Director of the United States Patent and Trademark Office*